(12) United States Patent
Niu et al.

(10) Patent No.: US 9,957,172 B2
(45) Date of Patent: May 1, 2018

(54) METHOD FOR REMOVING PERFLUORINATED COMPOUNDS BY CONCENTRATION AND SEPARATION

(71) Applicant: BEIJING NORMAL UNIVERSITY, Beijing (CN)

(72) Inventors: Junfeng Niu, Beijing (CN); Hui Lin, Beijing (CN); Qingguo Huang, Beijing (CN); Zhifang Chen, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 215 days.

(21) Appl. No.: 14/387,831

(22) PCT Filed: Apr. 18, 2014

(86) PCT No.: PCT/CN2014/075752
§ 371 (c)(1),
(2) Date: Sep. 24, 2014

(87) PCT Pub. No.: WO2015/143747
PCT Pub. Date: Oct. 1, 2015

(65) Prior Publication Data
US 2015/0360975 A1    Dec. 17, 2015

(30) Foreign Application Priority Data
Mar. 26, 2014   (CN) .......................... 2014 1 0115444

(51) Int. Cl.
*C02F 1/463*   (2006.01)
*C02F 11/00*   (2006.01)
(Continued)

(52) U.S. Cl.
CPC ............ *C02F 1/463* (2013.01); *C02F 11/004* (2013.01); *C02F 11/127* (2013.01);
(Continued)

(58) Field of Classification Search
CPC ...................................................... C02F 1/463
See application file for complete search history.

(56) References Cited

U.S. PATENT DOCUMENTS

| | | | |
|---|---|---|---|
| 6,613,941 B1 * | 9/2003 | Felix | B01J 41/043 516/138 |
| 2003/0060586 A1 * | 3/2003 | Whipple | C08F 220/34 526/319 |

(Continued)

FOREIGN PATENT DOCUMENTS

CN        1935770 A        3/2007

OTHER PUBLICATIONS

Deng et al, Removal of Perfluorooctanoate from Surface Water by Plyaluminium Chloride Coagulation, Water Research, 45 (2011), 1774-1780.*

(Continued)

*Primary Examiner* — Ibrahime A Abraham
*Assistant Examiner* — Salil Jain
(74) *Attorney, Agent, or Firm* — Anova Law Group, PLLC

(57) ABSTRACT

Various embodiments provide methods for removing a PFC by concentration and separation. In an exemplary method, a PFC in an aqueous solution or in a mixed water-organic solvent solution can be adsorbed onto a surface of a floc generated by electroflocculation, to form sludge. The sludge containing the PFC can be centrifuged to separate the PFC from the sludge and to form a concentrated PFC solution. Eelectroflocculation provides a simple process that is easy to operate. Reaction conditions are mild. Energy consumption is low. Treatment effect is desirable, stable, and reliable. Industrial application can be easy to implement. Further, the centrifugal separation technology used for the harmless treatment of the generated PFC-containing sludge is novel and does not need to use chemicals. Further, dewatering of (Continued)

the sludge is achieved at the same time during the harmless treatment. The needed equipment is simple and can be automatically operated.

17 Claims, 17 Drawing Sheets

(51) Int. Cl.
  *C02F 11/12* (2006.01)
  *C02F 1/461* (2006.01)
  *C02F 101/36* (2006.01)
  *C02F 103/00* (2006.01)
  *C02F 103/02* (2006.01)
  *C02F 103/06* (2006.01)

(52) U.S. Cl.
  CPC .......... *C02F 2001/46133* (2013.01); *C02F 2101/36* (2013.01); *C02F 2103/00* (2013.01); *C02F 2103/007* (2013.01); *C02F 2103/02* (2013.01); *C02F 2103/06* (2013.01); *C02F 2201/4617* (2013.01); *C02F 2201/46105* (2013.01)

(56) References Cited

U.S. PATENT DOCUMENTS

| | | |
|---|---|---|
| 2007/0138110 A1 | 6/2007 | Welcker |
| 2010/0051542 A1* | 3/2010 | Elektorowicz .......... C02F 1/463 210/631 |
| 2014/0042100 A1* | 2/2014 | Rytwo ...................... C02F 1/56 210/714 |
| 2014/0048490 A1 | 2/2014 | Du Pont |
| 2014/0158627 A1* | 6/2014 | Sato ........................ C01G 41/02 210/666 |
| 2014/0326674 A1* | 11/2014 | Richardson ............... C02F 1/66 210/696 |
| 2015/0315055 A1* | 11/2015 | Chidambaran .......... C02F 9/00 166/266 |

OTHER PUBLICATIONS

Shubo Deng et al. "Removal of perfluorooctanoate from surface water by polyaluminium chloride coagulation" Water Research, vol. 45, No. 4, Jan. 28, 2011 (Feb. 28, 2011), ISSN 0043-1354, see p. 1775, section 2.2 and 2.3 to p. 1779, section 4.

Qiongfang Zhuo et al. "Degradation of perfluorinated compounds on a boron-doped diamond electrode" Electrochimica Acta, vol. 77, Aug. 30, 2012 (Aug. 30, 2012), ISSN 0013-4686, pp. 17-22.

* cited by examiner

METHOD FOR REMOVING PERFLUORINATED COMPOUNDS BY CONCENTRATION AND SEPARATION

CROSS-REFERENCES TO RELATED APPLICATIONS

This application is a national stare of PCT Patent Application PCT/CN2014/075752, filed on Apr. 18, 2014, which claims the priority of Chinese Patent Application No. 201410115444.X, filed on Mar. 26, 2014, the entire contents of all of which are incorporated herein by reference.

FIELD OF THE DISCLOSURE

The present disclosure relates to the field of electrochemistry technology and environmental protection and, more particularly, relates to concentrating perfluorinated compounds (PFCs) in a solution by electroflocculation and treating generated PFC-containing sludge by centrifugation, to separate the PFCs from the sludge and thus achieve a purpose of removing the PFCs from the solution by concentration and separation.

BACKGROUND

Perfluorinated compounds (PFCs) are widely applied in industrial manufacturing, such as chemical industry, textile, paint, leather, synthetic detergent, cookware manufacturing (such as non-stick pans), paper packaging material for food, etc., because of their unique C-F chemical bond (having high bond energy, high redox potential, etc.). PFCs have been produced and used for more than 50 years. Perfluorooctanoic acid (PFOA) and perfluorooctane sulfonic acid (PFOS) are typical PFCs, and are widely used as surfactant, anti-fouling agent, additive, foam fire extinguishing agent, polymeric emulsifier, pesticide, etc. PFOA and PFOS are chemically stable and hardly biodegradable, and have frequently been detected in water, atmosphere, and biosphere throughout the world. PFOA can be absorbed by human body in various ways such as ingestion, inhalation, and skin contact, and may induce various diseases such as cancer, hepatomegaly, etc. Thus, PFOA poses a serious threat to human health.

At the beginning of the 21st century, as PFCs were frequently detected in human blood samples all over the world, global pollution of PFCs and impact of PFCs on human health have attracted attention of governments and scientific community. In December 2002, at the 34$^{th}$ Joint Meeting of the Chemical Committee held by the Organization for Economic Co-operation and Development (OECD), PFOS was defined as a substance that is persistent in the environment, bioaccumulative, and harmful to human beings. According to "the United States Toxic Substances Control Act" (2003), PFOS was included in the list of banned chemicals. In May 2009, PFOS and salts of PFOS, together with the precursor of PFOS, i.e., perfluorooctane sulfonyl fluoride, were officially added to Annex B (Restriction) of "Stockholm Convention on Persistent Organic Pollutants". Based on the above measures, production and use of PFCs have been constrained.

Currently, technologies for treating PFCs in a solution mainly include pyrolysis, electrochemical oxidation, sonochemistry, photocatalytic degradation, and the like. PFCs are from extensive sources in the environment, but exist in the environment with very low concentrations, usually ranging from nanogram level to microgram level in a water body, and up to milligram level in a heavily-polluted water body. When the above degradation technologies are directly used for treating water, energy consumption is high and efficiency is low, so the above degradation technologies are difficult to be applied at a large scale. A feasible technical route is to pretreat polluted water, to concentrate PFCs in the water body and thus reduce the amount of water for treatment.

Existing technologies for concentrating PFCs in a solution mainly include reverse osmosis and ion-exchange resin method. However, generally, reverse osmosis has a single-stage water production rate of less than 80%, and has a concentration ratio of less than 5. To improve the concentration ratio, multi-stage reverse osmosis has to be used, but cost of water treatment can be multiplied. Although the ion-exchange resin method using weak-base anion-exchange resins can have a high concentration ratio for PFCs in a solution, a large amount of chemical reagents, such as diluted aqueous ammonia or an organic acid, are needed for elution. This process is very time-consuming with complicated subsequent processing, and is expensive.

In this invention, floc generated by electroflocculation, such as ferric hydroxide or aluminum hydroxide, has a large specific surface area. PFCs in a solution can be quickly adsorbed onto the surface of the generated floc. By research, applicants have found that the floc generated by electroflocculation can adsorb and remove PFCs by hydrophobic interaction and hydrogen bonding. According to such characteristics, the PFCs adsorbed on the surface of the floc can be re-released into a solution by a centrifugal force, in order to achieve the purpose of concentrating and separating PFCs and, at the same time, achieve dewatering and harmless treatment of the sludge. Such a process can concentrate the PFCs in the solution by several hundred times. Therefore, using such a technology, PFCs at a low concentration in a solution can be concentrated, to reduce the cost of subsequent treatment of the PFCs solution and improve the efficiency of the treatment. Because electroflocculation has a low cost of treatment and produces a small amount of sludge, applying electroflocculation at a large scale is economically feasible.

To date, there has been no technical report related to removing PFCs in a solution by concentration and separation using electroflocculation and centrifugation techniques.

BRIEF SUMMARY OF THE DISCLOSURE

The present disclosure can be used to remedy PFC-related environmental pollution. Because PFCs are widely distributed with low concentration in environment, a method is provided by removing PFCs in a solution using electroflocculation, and treating generated PFC-containing sludge by centrifugation. Thus, the PFCs in the sludge can be re-released into a solution, to achieve the purpose of removing the PFCs from the solution by concentration and separation.

The present disclosure can achieve the above purpose by the following techniques.

Various embodiments provide methods for removing PFCs by concentration and separation. An exemplary method can include performing electroflocculation. PFCs in an aqueous solution or in a mixed water-organic solvent solution can be adsorbed onto a surface of floc that is generated by the electroflocculation, to form sludge. The method can further include centrifuging. The sludge containing the PFCs can be centrifuged, to separate the PFCs from the sludge and form a concentrated PFC solution.

In various embodiments, the PFCs in the aqueous solution or in the mixed water-organic solvent solution can have a mass concentration ranging from about 1 μg/L to about 100 g/L.

In various embodiments, the aqueous solution or the mixed water-organic solvent solution can have a pH value ranging from about 3 to about 11.

In various embodiments, during the electroflocculation, an anode of electrodes can be made of a material containing aluminum, iron, zinc, or any alloy(s) thereof.

In various embodiments, the electroflocculation can include DC electrolysis or pulse electrolysis.

In various embodiments, the DC electrolysis can have a current density ranging from about 5 mA/cm$^2$ to about 20 mA/cm$^2$, a spacing between electrodes ranging from about 5 mm to about 50 mm, and an electrolysis time ranging from about 10 min (i.e., minutes) to about 30 min.

In various embodiments, the pulse electrolysis can have a current density ranging from about 0.5 mA/cm$^2$ to about 2.0 mA/cm$^2$, a spacing between electrodes ranging from about 5 mm to about 50 mm, a duty cycle ranging from about 0.2 to about 0.8, and a frequency ranging from about 0.1 Hz to about 0.5 Hz, and an electrolysis time ranging from about 10 min to about 30 min.

In various embodiments, the centrifugation can have a centrifugal force ranging from about 10 G to about 100,000 G, and a centrifugation time ranging from about 1 min to about 30 min.

In various embodiments, the PFC can include at least one compound selected from perfluoroalkyl acids (or their salts) having a number of carbon atoms ranging from about 4 to about 20, and precursors of these perfluoroalkyl acids/salts.

In various embodiments, the PFCs can include at least one compound selected from perfluorooctanoic acid (PFOA), perfluorooctane sulfonic acid (PFOS), perfluorononanoic acid (PFNA), perfluorodecanoic acid (PFDA), perfluorooctane sulfonyl fluoride (POSF), and fluorotelomer alcohol (8:2 FTOH).

In various embodiments, the PFCs can include a polyfluoroalkyl compound.

In various embodiments, the polyfluoroalkyl compound can be selected from polyfluoroalkyl compounds having a number of carbon atoms ranging from about 4 to about 20.

In various embodiments, the polyfluoroalkyl compound can include at least one compound selected from N-ethyl perfluorooctane sulfonyl fluoride, N-ethyl perfluorooctane sulfonamido acetic acid, and 1H, 1H, 2H, 2H-perfluorooctane sulfonic acid.

Various embodiments further include methods for treating water, e.g., using the disclosed method for removing PFCs by concentration and separation.

The disclosed method for treating water can include a water body of drinking water, surface water, underground water, industrial wastewater, or a combination thereof.

According to various embodiments, the disclosed methods have the following advantages. The process can be simple and easy to operate. Reaction conditions can be mild. Energy consumption can be low. There is no need to add chemicals. Treatment effects can be desirable, stable, and reliable. Industrial application can be easy to implement. Further, the disclosed methods can be applicable to a wide range of concentrations, and can effectively remove PFC in a solution having a concentration ranging from about 1 μg/L to about 100 g/L, or greater than about 100 g/L. Further, floc has characteristics including large specific surface area and high activity. Therefore, an effect of enhanced flocculation can be achieved. Thus, treatment speed can be fast. After about 30 min of reaction, the removal rate of PFC(s) in the solution can be greater than about 99.9%. Still further, by using a centrifugal force ranging from about 10 G to about 100,000 G (G refers to Earth's gravitational force, e.g., 10 G refers to 10 times of the Earth's gravitational force), a harmless treatment can be performed on the generated PFC-containing sludge. After centrifugation of about 1 min to about 30 min, substantially all of the PFCs adsorbed to the sludge can be released, and dewatering of the sludge can be completed at the same time.

DETAILED DESCRIPTION

Figure 1A:
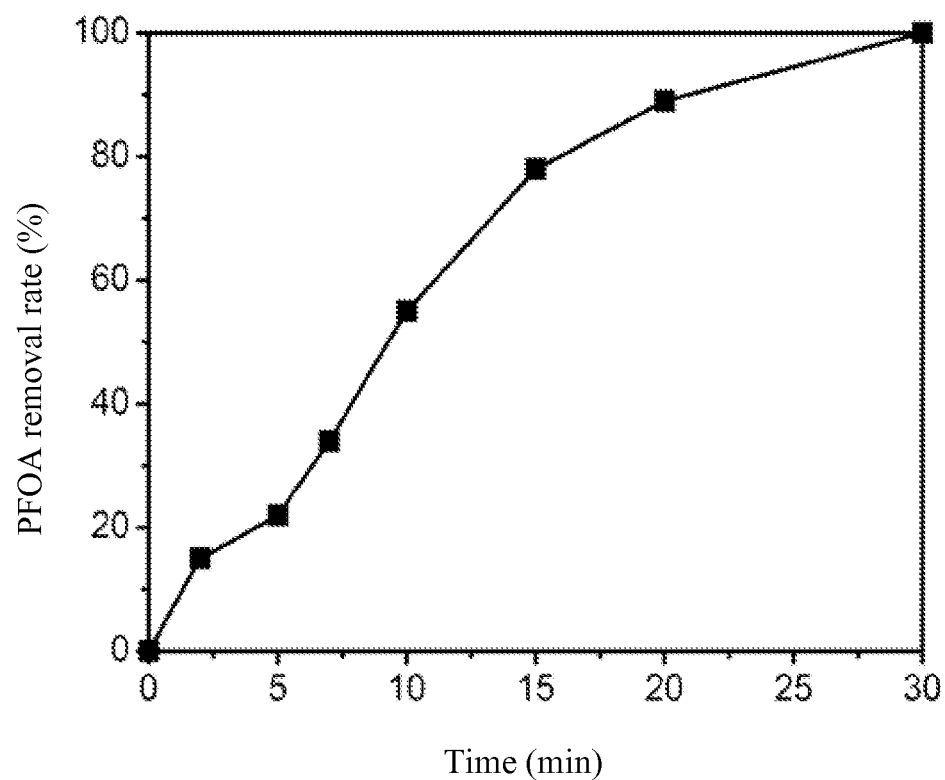
FIGS. 1(a) and 1(b) depict an effect of removing PFOA versus treatment time in accordance with Example 1 and Example 2, respectively.

In the present disclosure, an electroflocculation method can be used, to cause PFCs in a solution to be adsorbed on the surface of floc generated by electroflocculation, to form sludge. Further, by centrifugation, such sludge containing the PFCs can be centrifuged, such that the PFCs can be separated from the sludge, to form a concentrated solution of PFC(s) and at the same time, achieve dewatering and harmless treatment of the sludge.

A mechanism of using electroflocculation to remove PFC(s) in a solution can include the following. By electrolysis, an iron anode or an aluminum anode can generate floc including ferric hydroxide, aluminum hydroxide and/or the like. Such floc can have a large specific surface area. At the same time, a relatively great mount of hydroxyl groups can exist at the surface of the floc. The PFCs contain fluorine atoms, and the fluorine atoms can form hydrogen bonds with the hydroxyl groups at the surface of the floc. In addition, the surface of the floc including ferric hydroxide, aluminum hydroxide and/or the like, can be hydrophobic. The PFCs can further be adsorbed via hydrophobic interactions on the surface of the floc including ferric hydroxide, aluminum hydroxide and/or the like. Eventually, the PFCs can be adsorbed and removed from the solution via the hydrogen bond interactions and the hydrophobic interactions. Meanwhile, the presence of the electric field can promote the contact between PFCs and the floc including ferric hydroxide, aluminum hydroxide and/or the like, to achieve enhanced flocculation. Effect of removing the PFCs can be significantly improved.

A mechanism of separating PFCs in sludge by centrifugation can include the following. By studying the removal of PFCs using electroflocculation, it is found that the PFCs can be adsorbed on the surface of floc mainly via hydrogen bond interactions and hydrophobic interactions, to form sludge and thus be removed from the solution. Based on such adsorption characteristics, in the present disclosure, a centrifugal force can be used in order to overcome the interactions, such that the adsorbed PFCs can be re-released into a solution. Accordingly, the purpose of concentrating the PFCs in the solution can be achieved. Meanwhile, dewatering and harmless treatment of the sludge can be completed.

Various embodiments in the present disclosure can include the following steps.

The methods for removing PFCs in a solution by electroflocculation can include the following processes.

PFOA solutions, having a concentration of about 200 mg/L and about 500 μg/L, respectively, are prepared. PFOS solutions, having a concentration of about 200 mg/L and about 800 μg/L, respectively, are prepared. A mixed solution is prepared, the mixed solution containing four types of PFCs including PFOA, PFOS, perfluorononanoic acid (PFNA), and perfluorodecanoic acid (PFDA), where each of the PFOA, the PFOS, the PFNA and the PFDA has a concentration of about 100 mg/L. Three solutions are prepared, including a perfluorobutane sulfonic acid (PFBS) solution, a perfluorooctane sulfonyl fluoride (POSF) solution, and a (perfluorooctyl)ethyl alcohol (e.g., 8:2 fluorotelomer alcohol, or 8:2 FTOH) solution, each of the three solutions having a concentration of about 200 mg/L. A mixed water-organic solvent solution having a concentration of PFOA of about 200 mg/L is prepared, the mixed solution containing a mass percent concentration of isopropanol of about 5%. A mixed water-organic solvent solution having a concentration of PFOS of about 500 μg/L is prepared, the mixed solution containing a mass percent concentration of isopropanol of about 5%. A NaOH solution having a concentration of about 0.1 mol/L or a HCl solution having a concentration of about 0.1 mol/L can be used for adjusting the pH value of the above solutions, to prepare solution under different pH conditions.

Electrode plates can be pretreated. When the anode is made of an aluminum electrode plate, the electrode plate can be pretreated. The electrode plate can be polished with sandpaper, and be immersed in a hydrochloric acid solution having a mass percent concentration of about 10% for about 15 min, to remove a passivation film from the surface of the aluminum electrode plate, in order to activate the aluminum electrode plate.

An iron electrode plate or the pretreated aluminum electrode plate can be used as an anode. An iron electrode plate, an aluminum electrode plate, a stainless steel electrode plate, or a titanium electrode plate can be used as a cathode. A solution can thus be electrolyzed at room temperature using a DC power supply or a pulsed power supply, with a stirring speed of about 1500 rev/min. During the implementation, when the DC power supply is used for the electrolysis, a current density can range from about 5 mA/cm$^2$ to about 20 mA/cm$^2$, a spacing between electrode plates can range from about 5 mm to about 50 mm, and a supporting electrolyte can include sodium chloride or sodium sulfate having a concentration of about 10 mmol/L. When the pulsed power is used for the electrolysis, a current density can range from about 0.5 mA/cm$^2$ to about 2.0 mA/cm$^2$, a duty cycle can range from about 0.2 to about 0.8, and a frequency can range from about 0.1 Hz to about 0.5 Hz.

A reaction time gradient can be set to be about 2 min, about 5 min, about 7 min, about 10 min, about 15 min, about 20 min, and about 30 min. Samples can be regularly collected and analyzed. Three parallel implementations can be set up.

Liquid chromatography/triple quadrupole mass spectrometry (HPLC-MS/MS, API3200; Applied Biosystems, USA) can be used for quantitative analysis of the above compounds.

In the present disclosure, PFC(s) in a solution can be concentrated and separated by an electroflocculation method.

A solution of PFC(s) can refer to of an aqueous solution of PFC(s) or a mixed water-organic solvent solution of PFC(s). The concentration of the PFCs is not limited in the present disclosure. Optionally, the concentration of the PFCs can range from micrograms to milligrams.

Optionally, the aqueous solution of PFC(s) or the mixed water-organic solvent solution of PFC(s) can have a pH value ranging from about 3 to about 11.

Type of the PFC(s) is not specifically limited in the present disclosure. The PFCs(s) can include one or more compounds selected from perfluoroalkyl acids having a number of carbon atoms ranging from about 4 to about 20, perfluoroalkyl acid salts having a number of carbon atoms ranging from about 4 to about 20, and the precursors thereof. For example, the PFCs can include one or more of the following exemplary PFCs including perfluorooctanoic acid (PFOA), perfluorooctane sulfonic acid (PFOS), perfluorononanoic acid (PFNA), perfluorodecanoic acid (PFDA), perfluorooctane sulfonyl fluoride (POSF), (perfluorooctyl) ethyl alcohol (e.g., 8:2 FTOH), and the like.

In addition, the present disclosure can also be applied to polyfluoroalkyl compounds. The polyfluoroalkyl compounds can be selected from polyfluoroalkyl compounds having a number of carbon atoms ranging from about 4 to about 20. For example, the polyfluoroalkyl compounds can include N-ethyl-perfluorooctane sulfonyl fluoride (N-POSF), N-ethyl-perfluorooctane sulfonamido acetic acid (N-EtPOSAA), 1H, 1H, 2H, 2H-perfluorooctane sulfonic acid (e.g., 6:2 fluorotelomer sulfonic acid, or 6:2 FTS), and the like.

The type of materials of the anode used in the electroflocculation method is not limited in the present disclosure. Any type of materials that is generally used as the material of an anode can be used. Optionally, the material of the anode can be selected from aluminum, iron, zinc, or any alloy material containing one or more of the above metals.

The power supply used for the electroflocculation method can include a DC power supply or a pulsed power supply. The current density, the spacing between electrode plates, the duty cycle, and the frequency of the electroflocculation method are not limited in the present disclosure. When the DC power supply is used for electrolysis, the current density can optionally range from about 5 mA/cm$^2$ to about 20 mA/cm$^2$, and the spacing between electrode plates can optionally range from about 5 mm to about 50 mm. When the pulsed power is used for the electrolysis, the current density can optionally range from about 0.5 mA/cm$^2$ to about 2.0 mA/cm$^2$, the duty cycle can optionally range from about 0.2 to about 0.8, and the frequency can optionally range from about 0.1 Hz to about 0.5 Hz.

In addition, a centrifugation method can be used for performing a harmless treatment on generated PFC-containing sludge and for separating the PFCs from the sludge, to thus achieve the purpose of concentrating the PFCs in a solution. The sludge can refer to PFC-containing floc that is generated after using the electroflocculation method to treat the PFC-containing solution.

Figure 5:
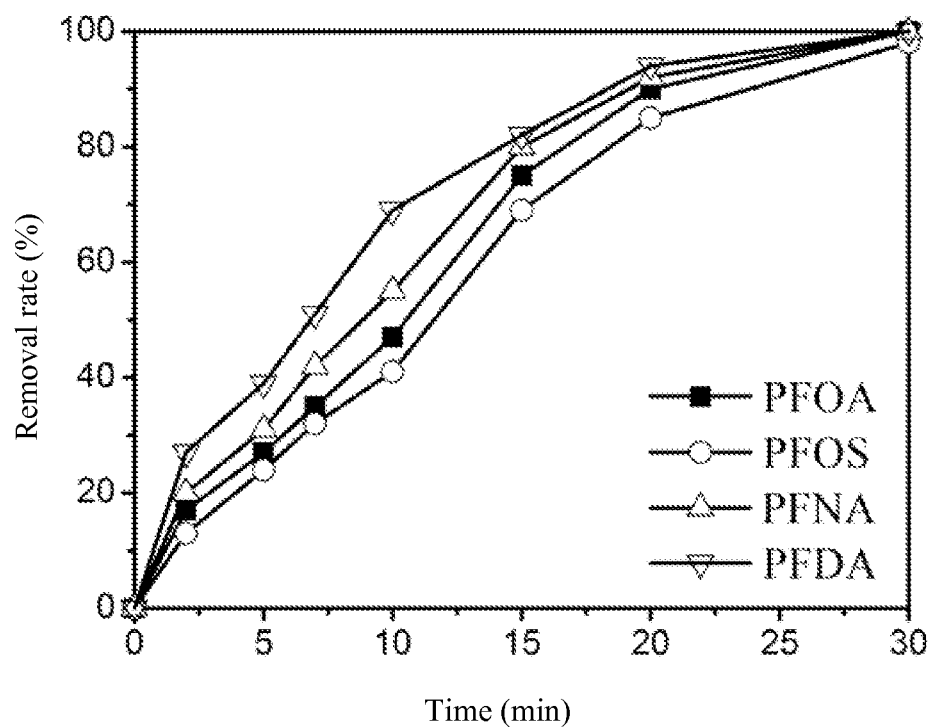
FIG. 5 depicts an effect of removing PFOA, PFNA, PFDA, and PFOS versus treatment time in accordance with Example 7.

As shown in FIG. 1 and FIG. 2, the electroflocculation method can effectively remove PFOA and PFOS that have different concentrations in solutions. After 30 minutes of reaction, the removal rates of both of PFOA and PFOS are more than about 90.0%. As can be seen in FIG. 5, after 30 minutes of reaction, all of PFOA, PFOS, PFNA, and PFDA have a removal rate of above about 95%.

A centrifugation method can be used for concentrating and separating PFCs in the sludge generated during the electroflocculation and, at the same time, dewatering the sludge and performing a harmless treatment on the sludge.

After about 30 min of reaction, the PFC-containing sludge can be poured into a centrifuge tube to be centrifuged. The centrifugal force can range from about 10 G to about 100000 G, and the centrifugation time can range from about 1 min to about 30 min. After the centrifugation, the concentration of PFCs in the concentrated solution containing the PFCs and the concentration of PFCs in the centrifuged sludge can be analyzed. The centrifuged sludge can be dissolved using a sodium hydroxide solution having a concentration of about 0.1 mol/L. According to FIG. 14 and FIG. 15, a removal rate of the PFCs in the sludge can be greater than about 99%.

According to the description of the drawings, the present disclosure is now described in further details.

In FIG. 1(a), an initial concentration of PFOA is about 200 mg/L. The anode is made of a material including 1060-type pure aluminum. A DC power supply is used for electrolysis.

Figure 1B:
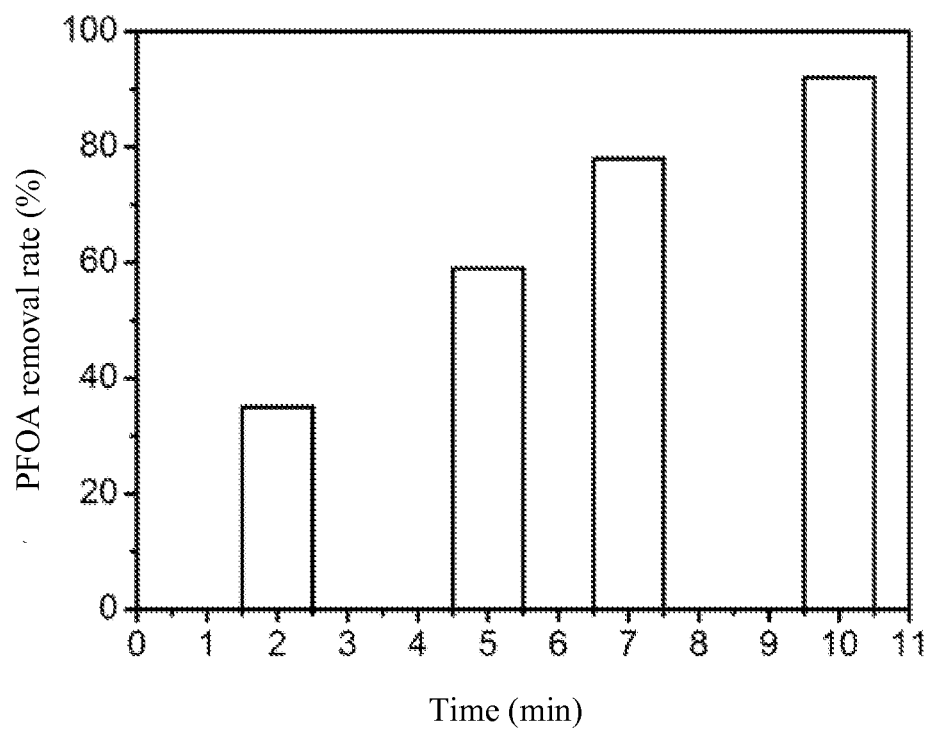

In FIG. 1(b), an initial concentration of PFOA is about 500 μg/L. The anode is made of a material including 1060-type pure aluminum. A DC power supply is used for electrolysis.

Figure 2A:
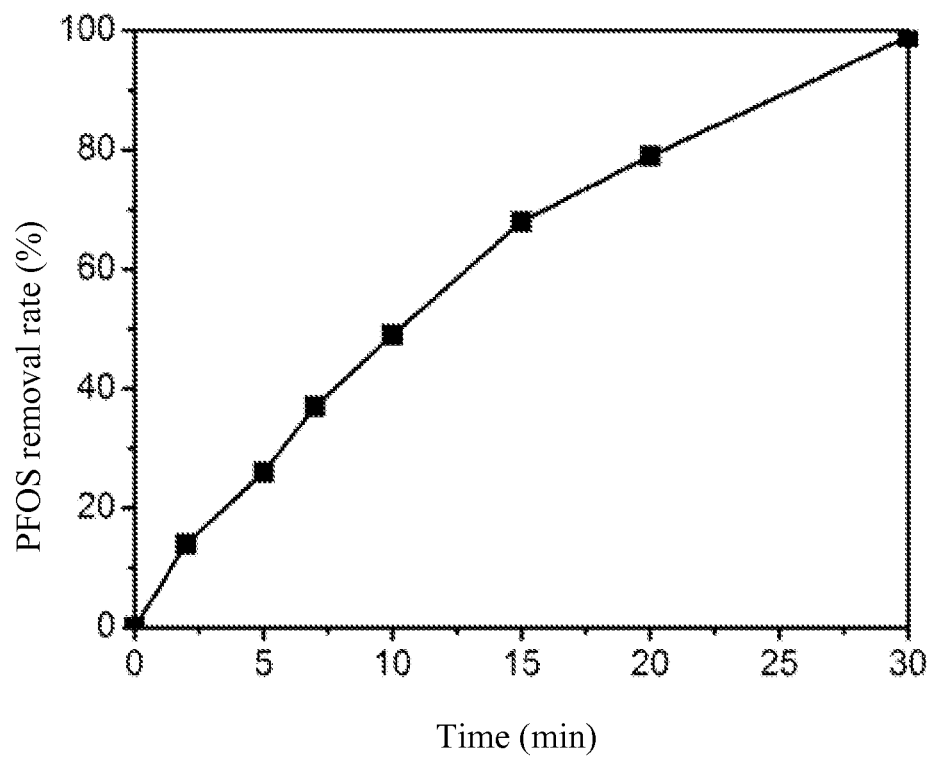
FIGS. 2(a) and 2(b) depict an effect of removing PFOS versus treatment time in accordance with Example 3 and Example 4, respectively.

In FIG. 2(a), an initial concentration of PFOS is about 200 mg/L. The anode is made of a material including 1060-type pure aluminum. A DC power supply is used for electrolysis.

Figure 2B:
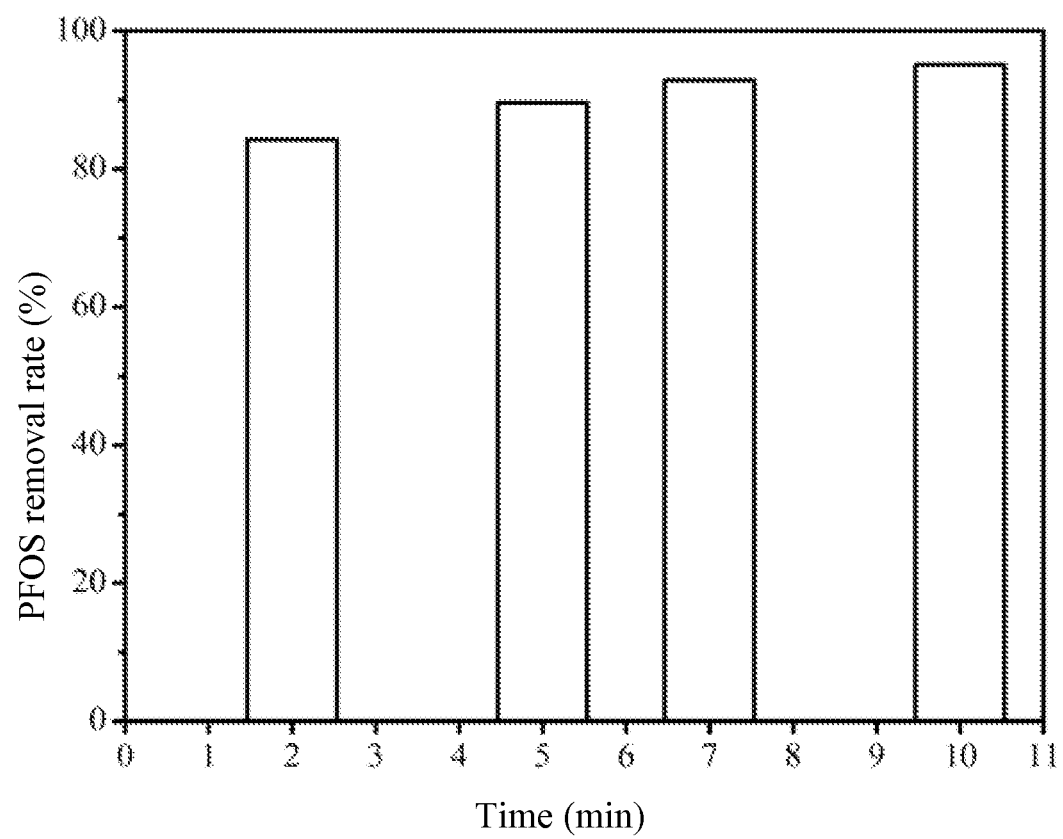

In FIG. 2(b), an initial concentration of PFOS is about 800 μg/L. The anode is made of a material including 1060-type pure aluminum. A DC power supply is used for electrolysis.

Figure 3:
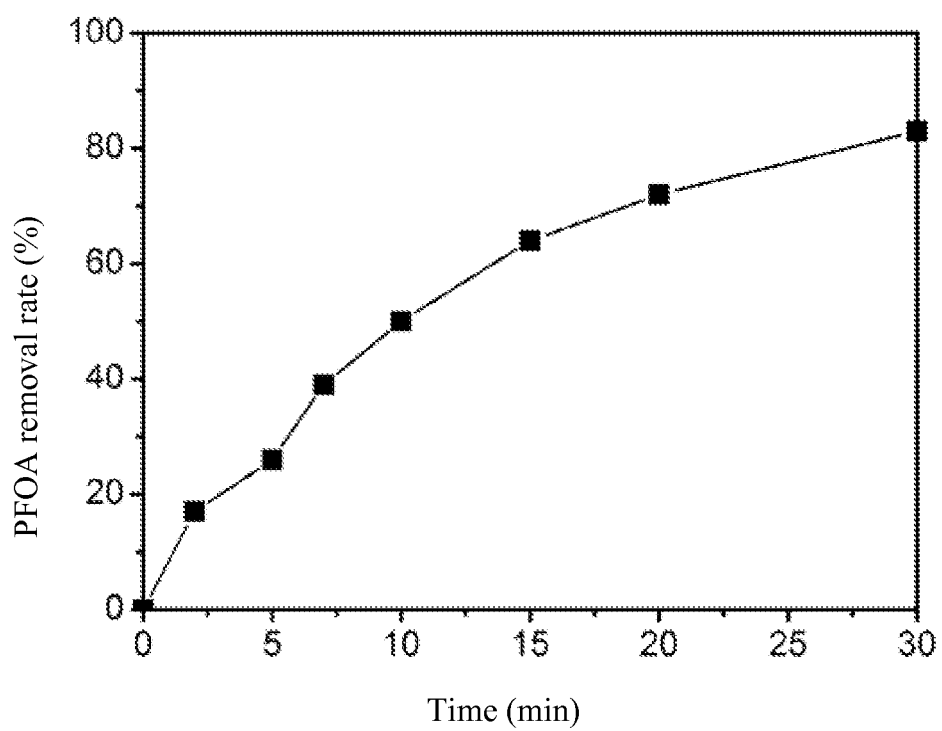
FIG. 3 depicts an effect of removing PFOA versus treatment time in accordance with Example 5.

In FIG. 3, an initial concentration of PFOA is about 200 mg/L. The anode is made of an iron electrode plate (iron content>about 99%). A DC power supply is used for electrolysis.

Figure 4:
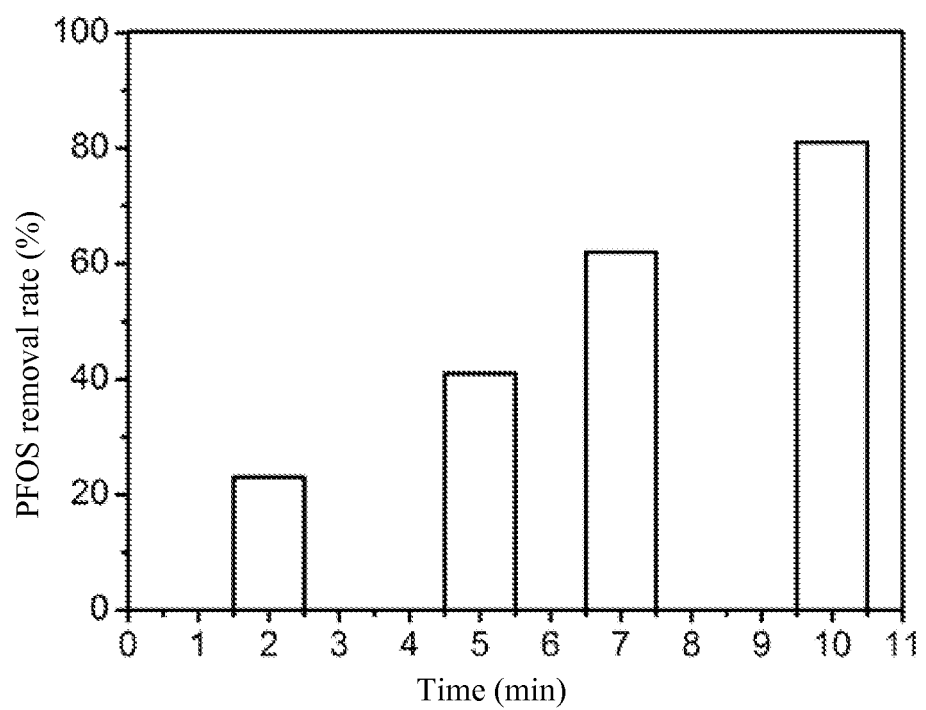
FIG. 4 depicts an effect of removing PFOS versus treatment time in accordance with Example 6.

In FIG. 4, an initial concentration of PFOS is about 500 μg/L. The anode is made of an iron electrode plate (iron content>about 99%). A DC power supply is used for electrolysis.

In FIG. 5, an initial concentration of each of PFOA, PFOS, PFNA and PFDA is about 100 mg/L. The anode is made of a material including 1060-type pure aluminum. A DC power supply is used for electrolysis.

Figure 6:
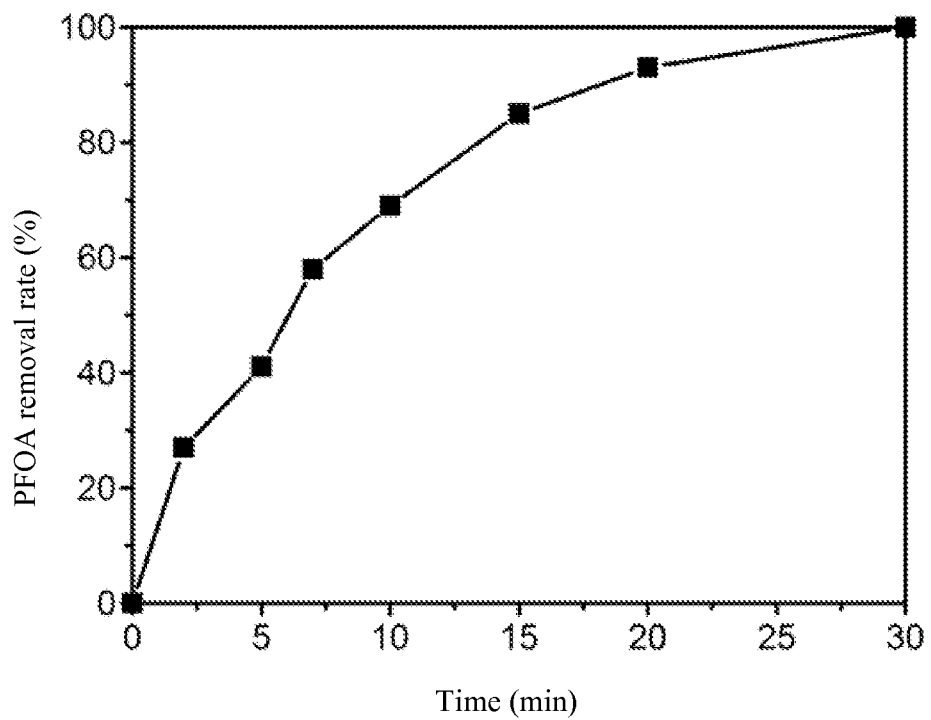
FIG. 6 depicts an effect of removing PFOA versus treatment time in accordance with Example 8.

In FIG. 6, an initial concentration of PFOA is about 200 mg/L. The anode is made of a material including 1060-type pure aluminum. A pulsed power supply is used for electrolysis.

Figure 7:
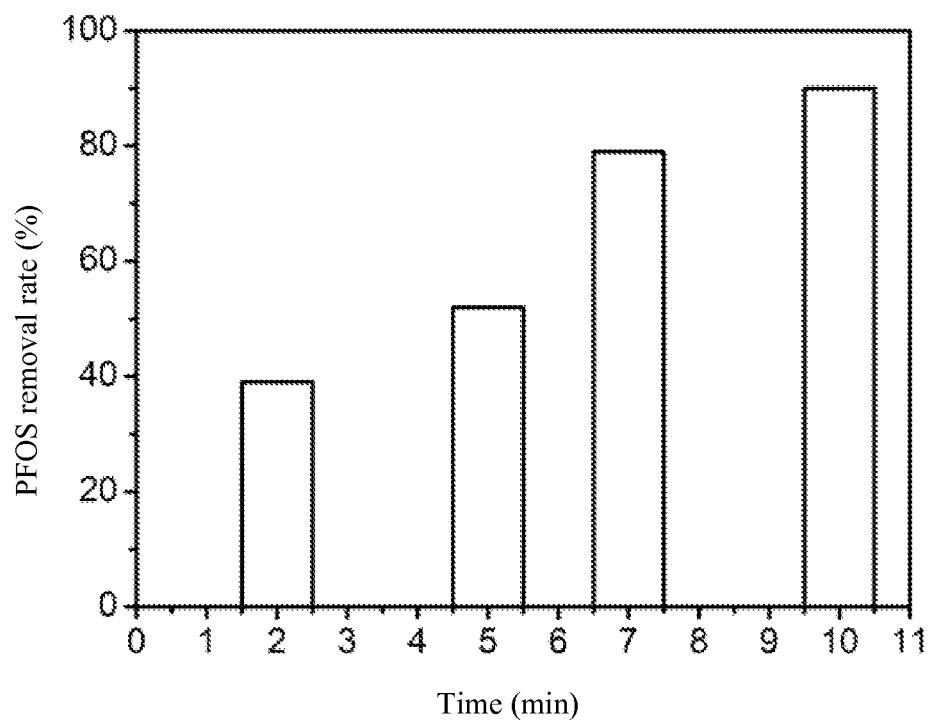
FIG. 7 depicts an effect of removing PFOS versus treatment time in accordance with Example 9.

In FIG. 7, an initial concentration of PFOS is about 500 μg/L. The anode is made of an iron electrode plate (iron content>about 99%). A pulsed power supply is used for electrolysis.

Figure 8:
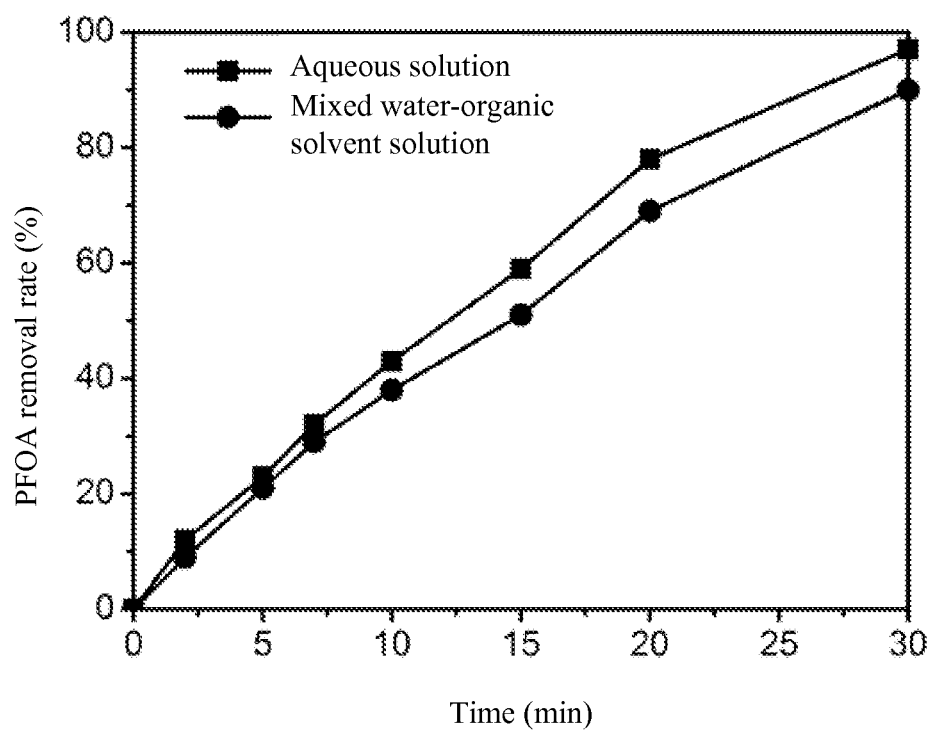
FIG. 8 depicts an effect of removing PFOA versus treatment time in accordance with Example 10.

In FIG. 8, an initial concentration of PFOA is about 200 mg/L. The anode is made of a material including 1060-type pure aluminum. A DC power supply is used for electrolysis.

Figure 9:
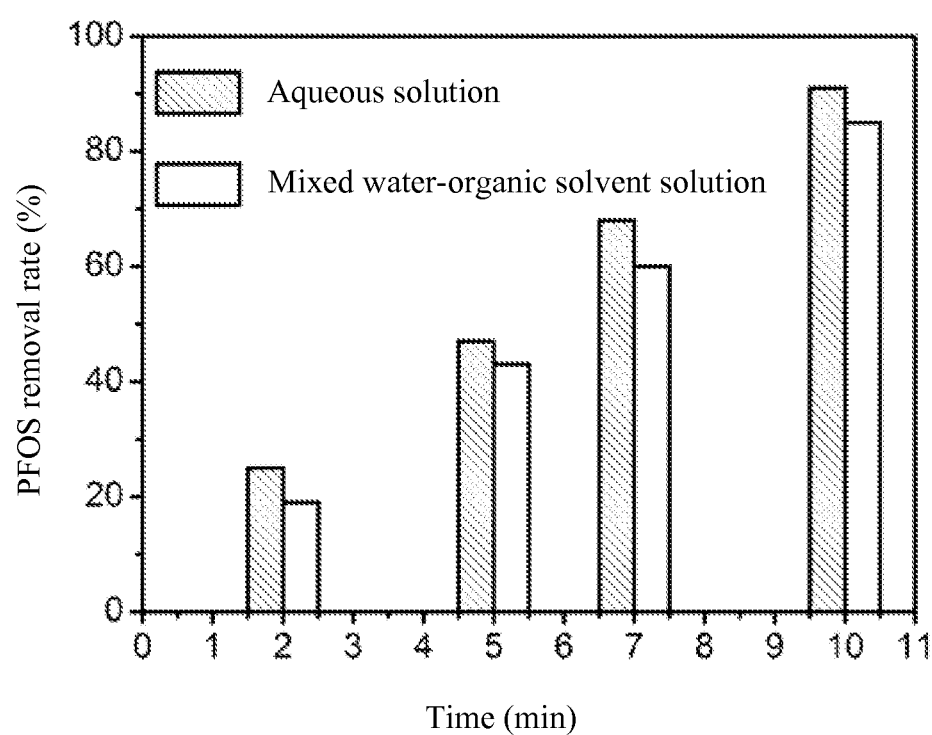
FIG. 9 depicts an effect of removing PFOS versus treatment time in accordance with Example 11.

In FIG. 9, an initial concentration of PFOS is about 500 μg/L. The anode is made of a material including 1060-type pure aluminum. A DC power supply is used for electrolysis.

Figure 10:
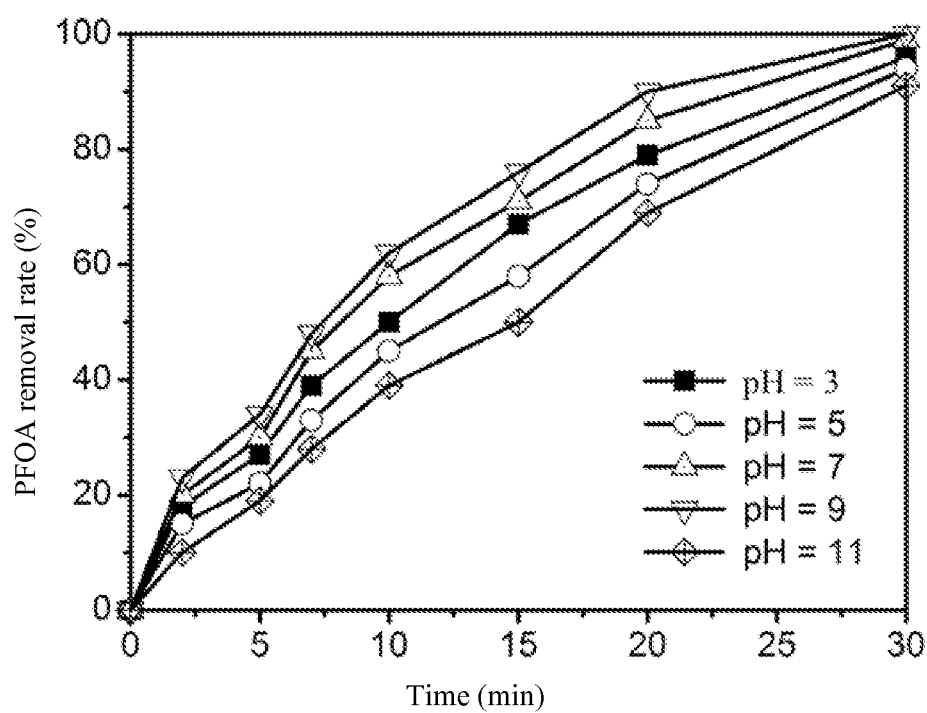
FIG. 10 depicts an effect of removing PFOA versus treatment time at different pH values, in accordance with Examples 12-16.

In FIG. 10, an initial concentration of PFOA is about 200 mg/L. The anode is made of a material including 1060-type pure aluminum. A DC power supply is used for electrolysis.

Figure 11:
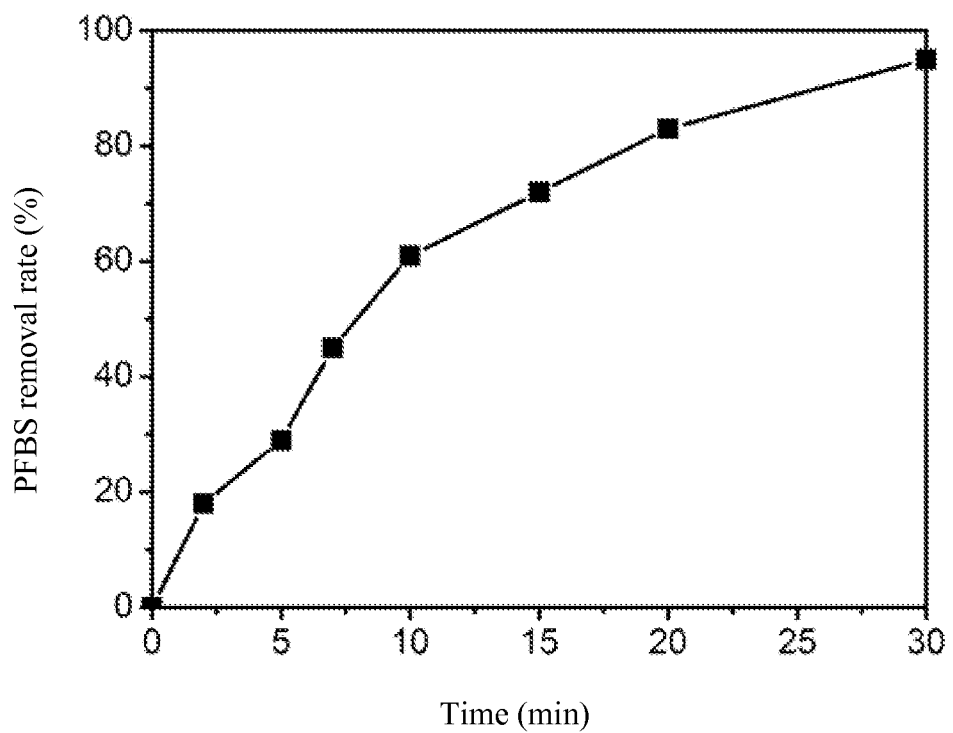
FIG. 11 depicts an effect of removing perfluorobutane sulfonic acid (PFBS) versus treatment time in accordance with Example 17.

In FIG. 11, an initial concentration of PFBS is about 200 mg/L. The anode is made of a material including 1060-type pure aluminum. A DC power supply is used for electrolysis.

Figure 12:
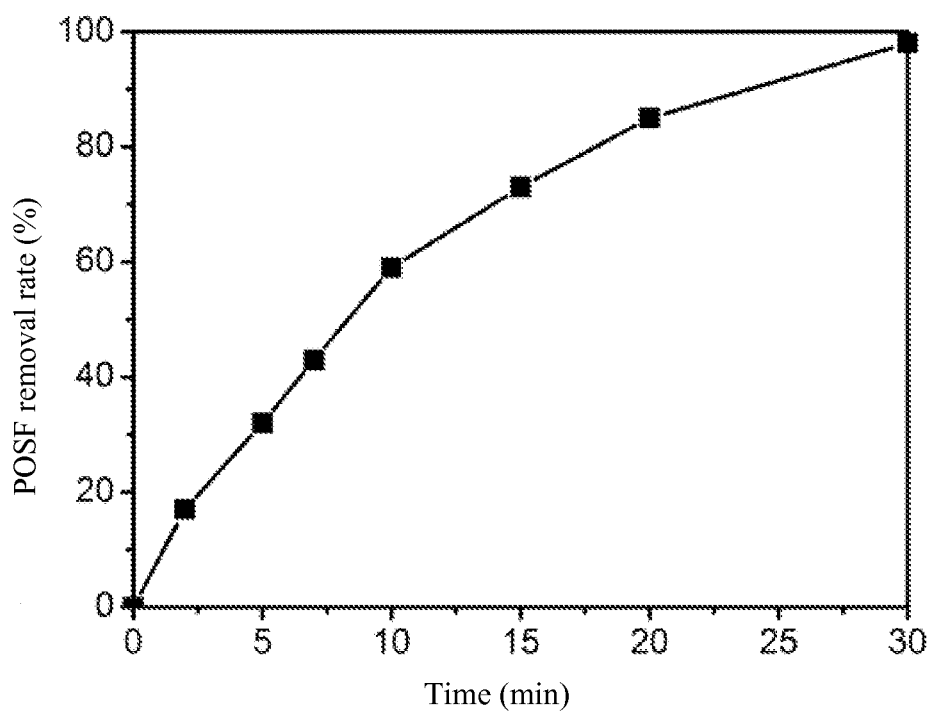
FIG. 12 depicts an effect of removing POSF versus treatment time in accordance with Example 18.

In FIG. 12, an initial concentration of POSF is about 200 mg/L. The anode is made of a material including 1060-type pure aluminum. A DC power supply is used for electrolysis.

Figure 13:
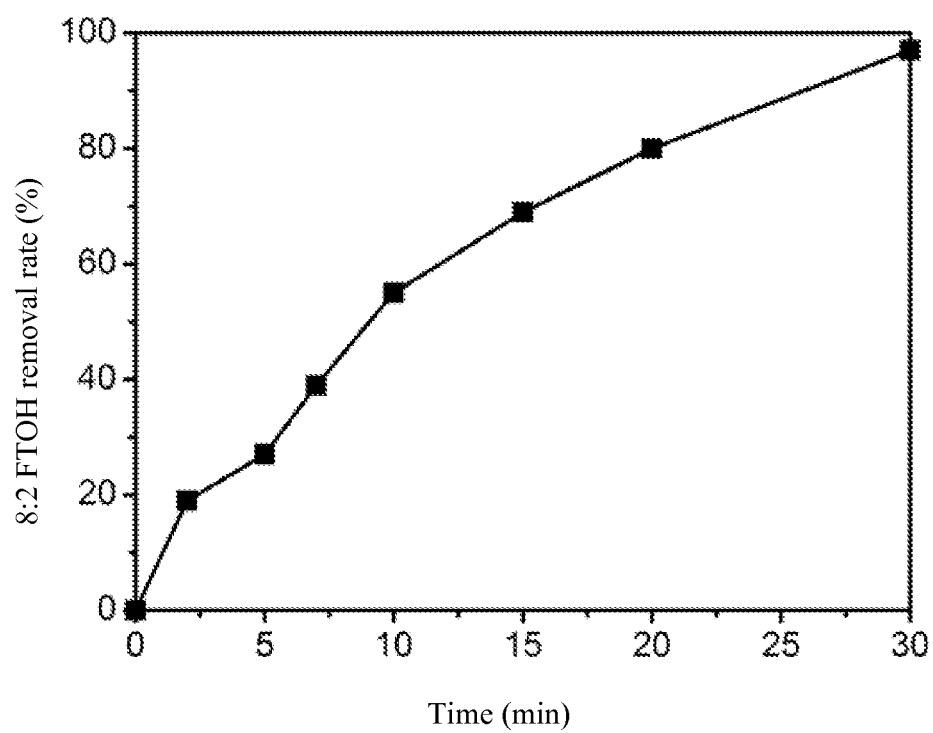
FIG. 13 depicts an effect of removing 8:2 FTOH versus treatment time in accordance with Example 19.

In FIG. 13, an initial concentration of 8:2 FTOH is about 200 mg/L. The anode is made of a material including 1060-type pure aluminum. A DC power supply is used for electrolysis.

Figure 14:
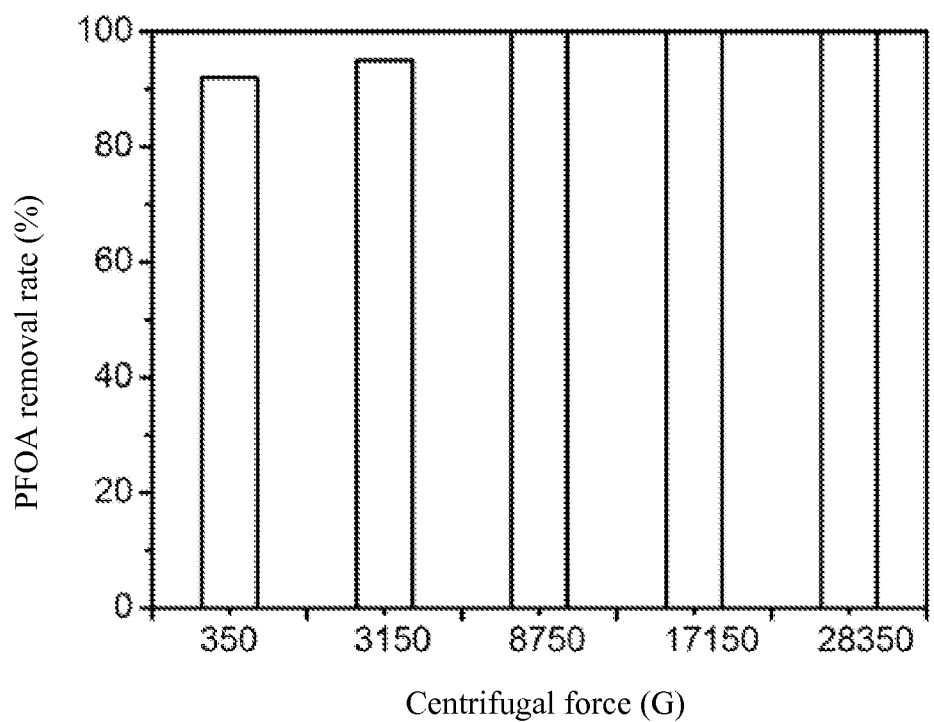
FIG. 14 depicts a centrifugation efficiency of PFOA versus a centrifugal force in accordance with Example 23.

In FIG. 14, each of the initial concentrations of PFOA is about 200 mg/L. The anode is made of a material including 1060-type pure aluminum. A DC power supply is used for electrolysis. The centrifugal force is about 350 G, about 3150 G, about 8750 G, about 17150 G, and about 28350 G, respectively.

Figure 15:
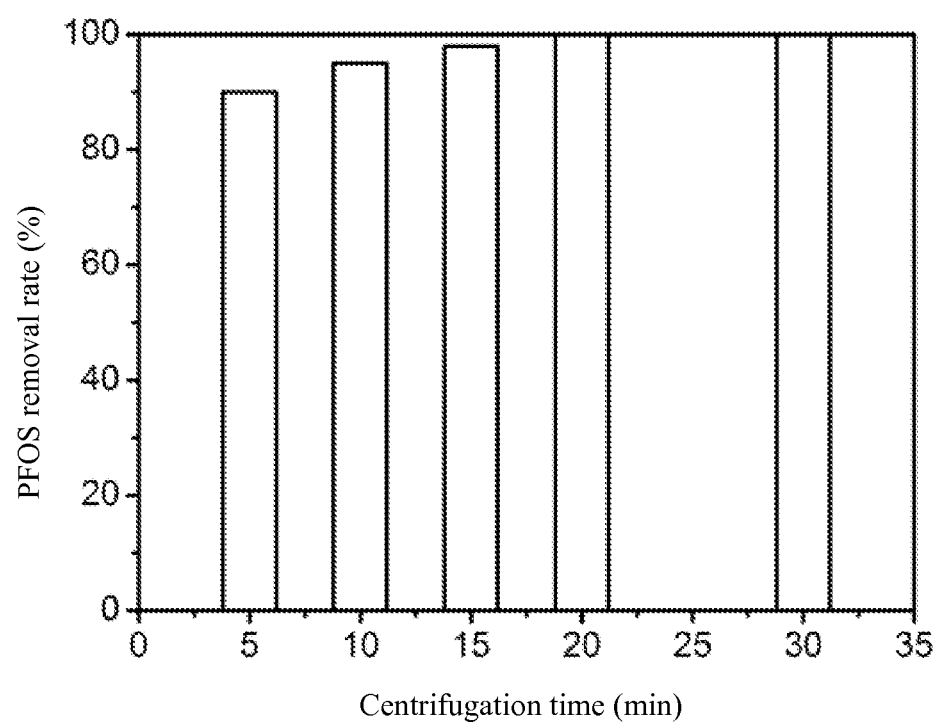
FIG. 15 depicts a centrifugation efficiency of PFOS versus a centrifugation time in accordance with Example 24.

In FIG. 15, each of the initial concentrations of PFOS is about 500 μg/L. The anode is made of a material including 1060-type pure aluminum. A DC power supply is used for electrolysis. The centrifugal force is about 350 G, about 3150 G, about 8750 G, about 17150 G, and about 28350 G, respectively.

Example 1

Treating a PFOA Solution Having a High Concentration Using an Electroflocculation Method.

About 500 mL of the PFOA solution having a concentration of about 200 mg/L was measured and placed into an electrolyzer. The anode is made of a material including 1060-type pure aluminum. The cathode can include a titanium electrode plate. The PFOA solution can be electrolyzed at room temperature using a DC power supply, with a current density of about 10 mA/cm$^2$ and a spacing between electrode plates of about 15 mm. Sampling and analysis are regularly performed. As shown in FIG. 1(a), after about 30 min of the electrolysis reaction, the removal rate of the PFOA in the solution can be greater than about 99%.

Example 2

Treating a PFOA Solution Having a Low Concentration Using an Electroflocculation Method.

About 500 mL of the PFOA solution having a concentration of about 500 μg/L was measured and placed into an electrolyzer. The anode is made of a material including 1060-type pure aluminum. The cathode can include a titanium electrode plate. The PFOA solution can be electrolyzed at room temperature using a DC power supply, with a current density of about 5 mA/cm$^2$ and a spacing between electrode plates of about 15 mm. Sampling and analysis are regularly performed. As shown in FIG. 1(b), after about 10 min of the electrolysis reaction, the removal rate of the PFOA in the solution can be greater than about 90%.

Example 3

Treating a PFOS Solution Having a High Concentration Using an Electroflocculation Method.

About 500 mL of the PFOS solution having a concentration of about 200 mg/L was measured and placed into an electrolyzer. The anode is made of a material including 1060-type pure aluminum. The cathode can include a titanium electrode plate. The PFOA solution can be electrolyzed at room temperature using a DC power supply, with a current density of about 15 mA/cm$^2$ and a spacing between electrode plates of about 15 mm. Sampling and analysis are regularly performed. As shown in FIG. 2(a), after about 30 min of the electrolysis reaction, the removal rate of the PFOS in the solution can be greater than about 99.0%.

Example 4

Treating a PFOS Solution Having a Low Concentration Using an Electroflocculation Method.

About 500 mL of the PFOA solution having a concentration of about 800 μg/L was measured and placed into an electrolyzer. The anode is made of a material including 1060-type pure aluminum. The cathode can include a titanium electrode plate. The PFOA solution can be electrolyzed at room temperature using a DC power supply, with a current density of about 10 mA/cm$^2$ and a spacing between electrode plates of about 15 mm. Sampling and analysis are regularly performed. As shown in FIG. 2(b), after about 10 min of the electrolysis reaction, the removal rate of the PFOS in the solution can be greater than about 95.0%.

Example 5

Treating a PFOA Solution Using an Electroflocculation Method.

About 500 mL of the PFOA solution having a concentration of about 200 mg/L was measured and placed into an electrolyzer. The anode is made of an iron electrode plate (iron content>about 99%). The cathode can include a titanium electrode plate. The PFOA solution can be electrolyzed at room temperature using a DC power supply, with a current density of about 10 mA/cm$^2$ and a spacing between electrode plates of about 15 mm. Sampling and analysis are regularly performed. As shown in FIG. 3, after about 30 min of the electrolysis reaction, the removal rate of the PFOA in the solution can be greater than about 80.0%.

Example 6

Treating a PFOS Solution Using an Electroflocculation Method.

About 500 mL of the PFOS solution having a concentration of about 500 μg/L was measured and placed into an electrolyzer. The anode is made of an iron electrode plate (iron content>about 99%). The cathode can include a titanium electrode plate. The PFOS solution can be electrolyzed at room temperature using a DC power supply, with a current density of about 10 mA/cm$^2$ and a spacing between electrode plates of about 15 mm. Sampling and analysis are regularly performed. As shown in FIG. 4, after about 10 min of the electrolysis reaction, the removal rate of the PFOS in the solution can be greater than about 80.0%.

Example 7

Treating a Mixed Solution Simultaneously Containing Multiple Types of PFCs Using an Electroflocculation Method.

About 500 mL of the mixed solution simultaneously containing PFOA, PFOS, PFNA, and PFDA was measured. Each of the contained PFCs has a concentration of about 100 mg/L. The anode is made of a material including 1060-type pure aluminum. The cathode can include a titanium electrode plate. The mixed solution can be electrolyzed at room temperature using a DC power supply, with a current density of about 20 mA/cm$^2$ and a spacing between electrode plates of about 20 mm. Sampling and analysis are regularly performed. As shown in FIG. 5, after about 30 min of the electrolysis reaction, the removal rate of each of the components in the solution can be greater than about 98.0%.

Example 8

Treating a PFOA Solution Using an Electroflocculation Method by a Pulsed Power Supply.

About 500 mL of the PFOA solution having a concentration of about 200 mg/L was measured and placed into an electrolyzer. Both of the anode and the cathode can be made of a material including 1060-type pure aluminum, with a spacing between electrode plates of about 15 mm. The pulsed power supply that is used can have a duty cycle of about 80%, a pulse frequency of about 0.5 Hz, and a pulse current density of about 2.0 mA/cm$^2$. The PFOA solution can be electrolyzed at room temperature. Sampling and analysis can be performed at various times during the electrolysis reaction. As shown in FIG. 6, after about 30 min of the electrolysis reaction, the removal rate of the PFOA in the solution can be greater than about 99.0%.

Example 9

Treating a PFOS Solution Using an Electroflocculation Method by a Pulsed Power Supply.

About 500 mL of the PFOS solution having a concentration of about 500 μg/L was measured and placed into an electrolyzer. Both of the anode and the cathode can be made of a material including 1060-type pure aluminum, with a spacing between electrode plates of about 15 mm. The pulsed power supply that is used can have a duty cycle of about 40%, a pulse frequency of about 0.1 Hz, and a pulse current density of about 0.5 mA/cm$^2$. The PFOS solution can be electrolyzed at room temperature. Sampling and analysis can be performed at various times during the electrolysis reaction. As shown in FIG. 7, after about 10 min of the electrolysis reaction, the removal rate of the PFOS in the solution can be greater than about 90.0%.

Example 10

Treating a Mixed Water-Organic Solvent Solution Containing PFOA Using an Electroflocculation Method.

About 500 mL of the mixed water-organic solvent solution having a concentration of PFOA of about 200 mg/L and a mass percent concentration of isopropanol of about 5% was measured. The mixed solution was placed into an electrolyzer. The anode is made of a material including 1060-type pure aluminum. The cathode can include a titanium electrode plate. The mixed solution can be electrolyzed at room temperature using a DC power supply, with a current density of about 15 mA/cm$^2$ and a spacing between electrode plates of about 15 mm. Sampling and analysis are regularly performed. As shown in FIG. 8, after about 30 min of the electrolysis reaction, the removal rate of PFOA in the solution can be greater than about 90.0%.

Example 11

Treating a Mixed Water-Organic Solvent Solution Containing PFOS Using an Electroflocculation Method.

About 500 mL of the mixed water-organic solvent solution having a concentration of PFOS of about 500 μg/L and a mass percent concentration of isopropanol of about 5% was measured. The mixed solution was placed into an electrolyzer. The anode is made of a material including 1060-type pure aluminum. The cathode can include a titanium electrode plate. The mixed solution can be electrolyzed at room temperature using a DC power supply, with a current density of about 10 mA/cm$^2$ and a spacing between electrode plates of about 10 mm. Sampling and analysis are regularly performed. As shown in FIG. 9, after about 10 min of the electrolysis reaction, the removal rate of PFOS in the solution can be greater than about 85.0%.

Example 12

Treating a PFOA Solution Having a pH Value of about 3 Using an Electroflocculation Method.

About 500 mL of the PFOA solution having a concentration of about 200 mg/L was measured and placed into an electrolyzer. The anode is made of a material including 1060-type pure aluminum. The cathode can include a titanium electrode plate. The PFOA solution can be electrolyzed at room temperature using a DC power supply, with a current density of about 10 mA/cm$^2$ and a spacing between electrode plates of about 15 mm. Sampling and analysis are regularly performed. As shown in FIG. 10, under the pH value of about 3, after about 30 min of the electrolysis reaction, the removal rate of the PFOA in the solution can be greater than about 90.0%.

Example 13

Treating a PFOA Solution Having a pH Value of about 5 Using an Electroflocculation Method.

The electroflocculation method can be implemented using the same process as depicted in Example 12, except that the pH value is different. As shown in FIG. 10, under the pH value of about 5, after about 30 min of the electrolysis reaction, the removal rate of the PFOA in the solution can be greater than about 90.0%.

Example 14

Treating a PFOA Solution Having a pH Value of about 7 Using an Electroflocculation Method.

The electroflocculation method can be implemented using the same process as depicted in Example 12, except that the pH value is different. As shown in FIG. 10, under the pH value of about 7, after about 30 min of the electrolysis reaction, the removal rate of the PFOA in the solution can be greater than about 90.0%.

Example 15

Treating a PFOA Solution Having a pH Value of about 9 Using an Electroflocculation Method.

The electroflocculation method can be implemented using the same process as depicted in Example 12, except that the pH value is different. As shown in FIG. 10, under the pH value of about 9, after about 30 min of the electrolysis reaction, the removal rate of the PFOA in the solution can be greater than about 90.0%.

Example 16

Treating a PFOA Solution Having a pH Value of about 11 Using an Electroflocculation Method.

The electroflocculation method can be implemented using the same process as depicted in Example 12, except that the pH value is different. As shown in FIG. 10, under the pH value of about 11, after about 30 min of the electrolysis reaction, the removal rate of the PFOA in the solution can be greater than about 90.0%.

Example 17

Treating a Perfluorobutane Sulfonic Acid (PFBS) Solution Using an Electroflocculation Method.

About 500 mL of the PFBS solution having a concentration of about 200 mg/L was measured and placed into an electrolyzer. The anode is made of a material including 1060-type pure aluminum. The cathode can include a titanium electrode plate. The PFBS solution can be electrolyzed at room temperature using a DC power supply, with a current density of about 10 mA/cm$^2$ and a spacing between electrode plates of about 10 mm. Sampling and analysis are regularly performed. As shown in FIG. 11, after about 30 min of the electrolysis reaction, the removal rate of the PFBS in the solution can be greater than about 95.0%.

Example 18

Treating a Perfluorooctane Sulfonyl Fluoride (POSF) Solution Using an Electroflocculation Method.

About 500 mL of the POSF solution having a concentration of about 200 mg/L was measured and placed into an electrolyzer. The anode is made of a material including 1060-type pure aluminum. The cathode can include a titanium electrode plate. The POSF solution can be electrolyzed at room temperature using a DC power supply, with a current density of about 15 mA/cm$^2$ and a spacing between electrode plates of about 15 mm. Sampling and analysis are regularly performed. As shown in FIG. 12, after about 30 min of the electrolysis reaction, the removal rate of the POSF in the solution can be greater than about 98.0%.

Example 19

Treating a (Perfluorooctyl)Ethyl Alcohol (8:2 FTOH) Solution Using an Electroflocculation Method.

About 500 mL of the 8:2 FTOH solution having a concentration of about 200 mg/L was measured and placed into an electrolyzer. The anode is made of a material including 1060-type pure aluminum. The cathode can include a titanium electrode plate. The POSF solution can be electrolyzed at room temperature using a DC power supply, with a current density of about 15 mA/cm$^2$ and a spacing between electrode plates of about 10 mm. Sampling and analysis are regularly performed. As shown in FIG. 13, after about 30 min of the electrolysis reaction, the removal rate of the 8:2 FTOH in the solution can be greater than about 97.0%.

Example 20

Using a Centrifugation Method to Treat PFOA-Containing Sludge that is Generated by the Electroflocculation Method, and Separating the PFOA from the Sludge.

The PFOA-containing sludge that is generated by the electroflocculation method in Example 1 was taken and poured into a centrifuge tube having a volume of about 50 mL. The centrifuge tube can be placed in a large-capacity low-speed desktop centrifuge of model RJ-TDL-50A. Under a centrifugal force of about 8750 G, the sludge was centrifuged for about 10 min. After the centrifugation treatment, the sludge can have a moisture content of about 82.5%. The sludge after the centrifugation treatment can be dissolved in a NaOH solution having a concentration of about 0.1 mol/L. The content of PFOA in the sludge after the centrifugation treatment can be analyzed. Results show that the centrifugation can effectively separate the PFOA from the sludge. After about 10 min of the centrifugation, the removal rate of the PFOA in the sludge can be greater than about 99.0%.

Example 21

Using a Centrifugation Method to Treat PFOS-Containing Sludge that is Generated by the Electroflocculation Method, and Separating the PFOS from the Sludge.

The PFOS-containing sludge that is generated by the electroflocculation method in Example 4 was taken and poured into a centrifuge tube having a volume of about 50 mL. The centrifuge tube can be placed in a large-capacity low-speed desktop centrifuge of model RJ-TDL-50A. Under a centrifugal force of about 3150 G, the sludge was centrifuged for about 5 min. After the centrifugation treatment, the sludge can have a moisture content of about 84.2%. The sludge after the centrifugation treatment can be dissolved in a NaOH solution having a concentration of about 0.1 mol/L. The content of PFOS in the sludge after the centrifugation treatment can be analyzed. The results show that the centrifugation can effectively separate the PFOS from the sludge. After about 10 min of the centrifugation, the removal rate of the PFOS in the sludge can be greater than about 99.0%.

Example 22

Using a Centrifugation Method to Treat PFOA-Containing Sludge that is Generated by the Electroflocculation Method, and Separating the PFOA from the Sludge.

About 10 L of the PFOA solution having a concentration of about 500 μg/L was measured and placed into an electrolyzer. The anode can be made of a material including 1060-type pure aluminum. The cathode can include a titanium electrode plate. The PFOA solution can be electrolyzed at room temperature using a DC power supply, with a current density of about 10 mA/cm$^2$ and a spacing between electrode plates of about 30 mm. Sampling and analysis are regularly performed. After about 30 min of the electrolysis reaction, the generated PFOA-containing sludge was taken and placed into a centrifuge tube having a volume of about 50 mL. The centrifuge tube can be placed in a large-capacity low-speed desktop centrifuge of model RJ-TDL-50A. Under a centrifugal force of about 17150 G, the sludge was centrifuged for about 10 min, to obtain about 65 mL of the solution by the centrifugation. After the centrifugation treatment, the sludge can have a moisture content of about 80.3%. The sludge after the centrifugation treatment can be dissolved in a NaOH solution having a concentration of about 0.1 mol/L. The content of PFOA in the sludge after the centrifugation treatment can be analyzed. The results show that the centrifugation can effectively separate the PFOA from the sludge. After about 10 min of the centrifugation, the removal rate of the PFOA in the sludge can be greater than about 99.0%. The PFOA-containing solution is concentrated by a factor of about 150.

Example 23

Using a Centrifugation Method Under Various Centrifugal Forces to Treat PFOA-Containing Sludge that is Generated by an Electroflocculation Method, and Separating the PFOA from the Sludge.

5 parts of the PFOA-containing sludge that is generated by the electroflocculation method in Example 5 were taken. Each of the 5 parts were poured into a centrifuge tube having a volume of about 50 mL. The centrifuge tube can be placed in a large-capacity low-speed desktop centrifuge of model RJ-TDL-50A. The 5 parts of the PFOA-containing sludge can be centrifuged for about 10 min, under a centrifugal force of about 350 G, 3150 G, 8750 G, 17150 G, and 28350 G, respectively and sequentially. After the centrifugation treatment, the sludge can have a moisture content of about 80.1%. The sludge after the centrifugation treatment can be dissolved in a NaOH solution having a concentration of about 0.1 mol/L. The content of PFOA in the sludge after the centrifugation treatment can be analyzed. As shown in FIG. 14, the centrifugation can effectively separate the PFOA from the sludge of all of the 5 parts. After about 10 min of the centrifugation, the removal rate of the PFOA in the sludge can be greater than about 90.0%.

Example 24

Using a Centrifugation Method for Various Centrifugation Times to Treat PFOS-Containing Sludge that is Generated by an Electroflocculation Method, and Separating the PFOS from the Sludge.

5 parts of the PFOS-containing sludge that is generated by the electroflocculation method in Example 9 were taken. Each of the 5 parts were poured into a centrifuge tube having a volume of about 50 mL. The centrifuge tube can be placed in a large-capacity low-speed desktop centrifuge of model RJ-TDL-50A. The 5 parts of the PFOA-containing sludge can be centrifuged under a centrifugal force of about 3150 G for about 5 min, about 10 min, about 15 min, about 20 min, and about 30 min, respectively and sequentially. After the centrifugation treatment, the sludge can have a moisture content of about 85.0%. The sludge after the centrifugation treatment can be dissolved in a NaOH solution having a concentration of about 0.1 mol/L. The content of PFOS in the sludge after the centrifugation treatment can be analyzed. As shown in FIG. 15, the centrifugation can effectively separate the PFOA from the sludge of all of the 5 parts. The removal rate of the PFOA in the sludge of all of the 5 parts can be greater than about 90.0%.

Example 25

Treating an Aqueous Film-Forming Foams Fire Extinguishing Agent (AFFF) Solution Using an Electroflocculation Method.

About 500 mL of the AFFF solution was measured and placed into an electrolyzer. The AFFF solution has a mass percent concentration of PFOS of about 0.3%. The anode is made of a material including 1060-type pure aluminum. The cathode can include a titanium electrode plate. The AFFF solution can be electrolyzed at room temperature using a DC power supply, with a current density of about 20 mA/cm$^2$ and a spacing between electrode plates of about 30 mm. Sampling and analysis is performed after about 30 min of the electrolysis reaction. Results show that the removal rate of PFOS in the AFFF solution can be greater than about 80%.

Example 26

Treating PFC-Containing Wastewater Using an Electroflocculation Method.

About 500 mL of the wastewater produced by semiconductor industry was measured. The wastewater was placed into an electrolyzer. The concentrations of PFBS and PFOS are measured to be about 8.3 mg/L and about 17.5 mg/L, respectively. The wastewater has a pH value of about 6.3. The anode is made of a material including 1060-type pure aluminum. The cathode can include a titanium electrode plate. The wastewater can be electrolyzed at room temperature using a DC power supply, with a current density of about 10 mA/cm$^2$ and a spacing between electrode plates of about 20 mm. Sampling and analysis are regularly performed. Results show that, after about 10 min of the electrolysis reaction, the removal rate of PFBS and PFOS in the wastewater can reach about 92% and 96%, respectively. After about 20 min of the electrolysis reaction, the removal rate of both of PFBS and PFOS in the wastewater can be greater than 99%.

According to various embodiments, the disclosed methods have the following advantages. The disclosed methods can be applicable to a wide range of concentrations, and can effectively remove PFC(s) in a solution having a concentration ranging from about 1 μg/L to about 100 g/L, or greater than about 100 g/L. Further, floc has characteristics including large specific surface area and high activity. Therefore, an effect of enhanced flocculation can be achieved. Thus, the treatment speed can be fast. After about 30 min of reaction, the removal rate of PFC(s) in the solution can be greater than about 99.9%. Still further, by using a centrifugal force ranging from about 10 G to about 100000 G, a harmless treatment can be performed on the generated PFC-containing sludge. After centrifugation of a time length ranging from about 1 min to about 30 min, substantially all of the PFC(s) adsorbed to the sludge can be released, and dewatering of the sludge can be completed at the same time.

In the disclosed methods, an electroflocculation method can be used. Thus, the process can be simple and easy to operate. Reaction conditions can be mild. Energy consumption can be low. Treatment effect can be desirable, stable, and reliable. Industrial application can be easy to implement. In addition, the centrifugal separation technology used for the harmless treatment of the generated PFC-containing sludge is novel and does not need to use chemicals. Further, dewatering of the sludge can be achieved at the same time during the harmless treatment. The needed equipment is simple. Automated operation can be easy to implement.

What is claimed is:

1. A method for removing a perfluorinated compound (PFC) by concentration and separation, comprising:
    performing an electroflocculation to generate a floc to adsorb the PFC via hydrogen bond interactions and hydrophobic interactions from an aqueous solution or from a mixed water-organic solvent solution onto a surface of the floc, to form a sludge containing the floc and the PFC adsorbed on the surface of the floc; and
    performing a centrifugation without adding any chemicals to centrifuge the sludge containing the floc and the adsorbed PFC to separate the PFC from the floc of the sludge by overcoming the hydrogen bond interactions and the hydrophobic interactions via the centrifugation, such that the PFC is centrifuged out and separated from the floc to simultaneously provide a concentrated PFC solution and a dewatered sludge.

2. The method according to claim 1, wherein the PFC in the aqueous solution or in the mixed water-organic solvent solution has a mass concentration ranging from about 1 μg/L to about 100 g/L.

3. The method according to claim 1, wherein the aqueous solution or the mixed water-organic solvent solution has a pH value ranging from about 3 to about 11.

4. The method according to claim 1, wherein:
    the electroflocculation comprises a DC electrolysis or a pulse electrolysis, using electrode plates including an anode and a cathode, and
    the anode is made of a material including aluminum, iron, zinc, or an alloy containing at least one metal thereof.

5. The method according to claim 4, wherein the DC electrolysis has a current density ranging from about 5 mA/cm$^2$ to about 20 mA/cm$^2$, a spacing between the electrode plates ranging from about 5 mm to about 50 mm, and an electrolysis time ranging from about 10 min to about 30 min.

6. The method according to claim 4, wherein the pulse electrolysis has a current density ranging from about 0.5 mA/cm$^2$ to about 2.0 mA/cm$^2$, a spacing between the electrode plates ranging from about 5 mm to about 50 mm, a duty cycle ranging from about 0.2 to about 0.8, a frequency ranging from about 0.1 Hz to about 0.5 Hz, and an electrolysis time ranging from about 10 min to about 30 min.

7. The method according to claim 1, wherein the centrifugation has a centrifugal force ranging from about 10 G to about 100000 G, and a centrifugation time ranging from about 1 min to about 30 min.

8. The method according to claim 1, wherein the PFC includes one or more compounds selected from perfluoroalkyl acids having a number of carbon atoms ranging from about 4 to about 20, perfluoroalkyl acid salts having a number of carbon atoms ranging from about 4 to about 20, and precursors of both the perfluoroalkyl acids and the perfluoroalkyl acid salts.

9. The method according to claim 1, wherein the PFC includes one or more compounds selected from perfluorooctanoic acid (PFOA), perfluorooctane sulfonic acid (PFOS), perfluorononanoic acid (PFNA), perfluorodecanoic acid (PFDA), perfluorooctane sulfonyl fluoride (POSE), and (perfluorooctyl)ethyl alcohol (8:2 FTOH).

10. The method according to claim 1, wherein the PFC includes a polymer containing a polyfluoroalkyl compound, selected from polyfluoroalkyl compounds having a number of carbon atoms ranging from about 4 to about 20.

11. The method according to claim 10, wherein the polyfluoroalkyl compound includes one or more compounds selected from N-ethyl perfluorooctane sulfonyl fluoride, N-ethyl perfluorooctane sulfonamido acetic acid, and 1H, 1H, 2H, 2H-perfluorooctane sulfonic acid.

12. A method for treating water using the method according to claim 1.

13. The method according to claim 12, wherein the water includes drinking water, surface water, underground water, industrial wastewater, or a combination thereof.

14. A method for treating water using the method according to claim 2.

15. A method for treating water using the method according to claim 3.

16. The method according to claim 1, wherein:
the surface of the floc includes hydroxyl groups, and
the floc includes a material including ferric hydroxide, aluminum hydroxide, or a combination thereof.

17. The method according to claim 1, further including:
prior to performing the centrifugation, pouring the sludge containing the floc and the adsorbed PFC into a centrifuge tube for the centrifugation.

* * * * *